United States Patent Office 3,061,448
Patented Oct. 30, 1962

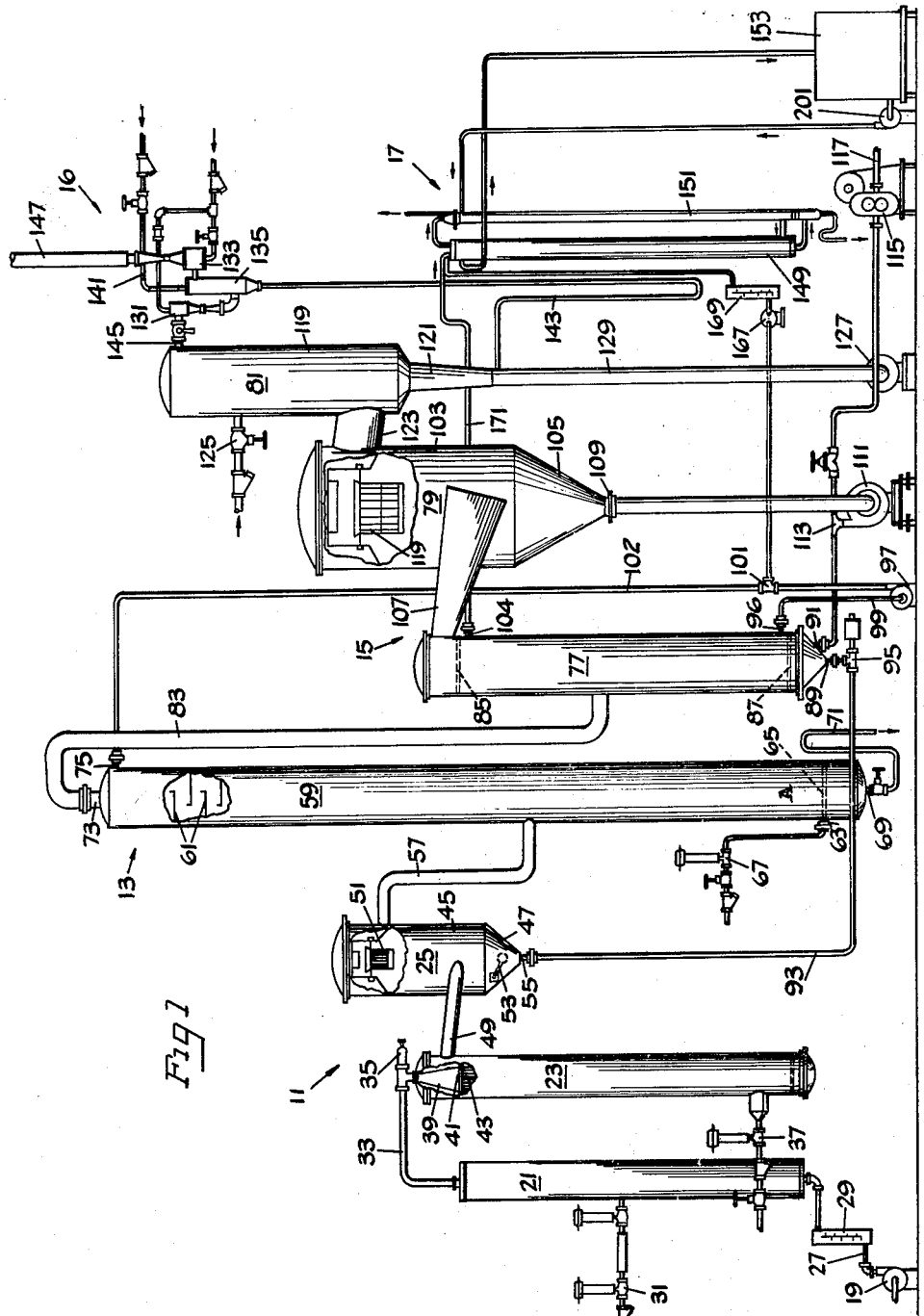

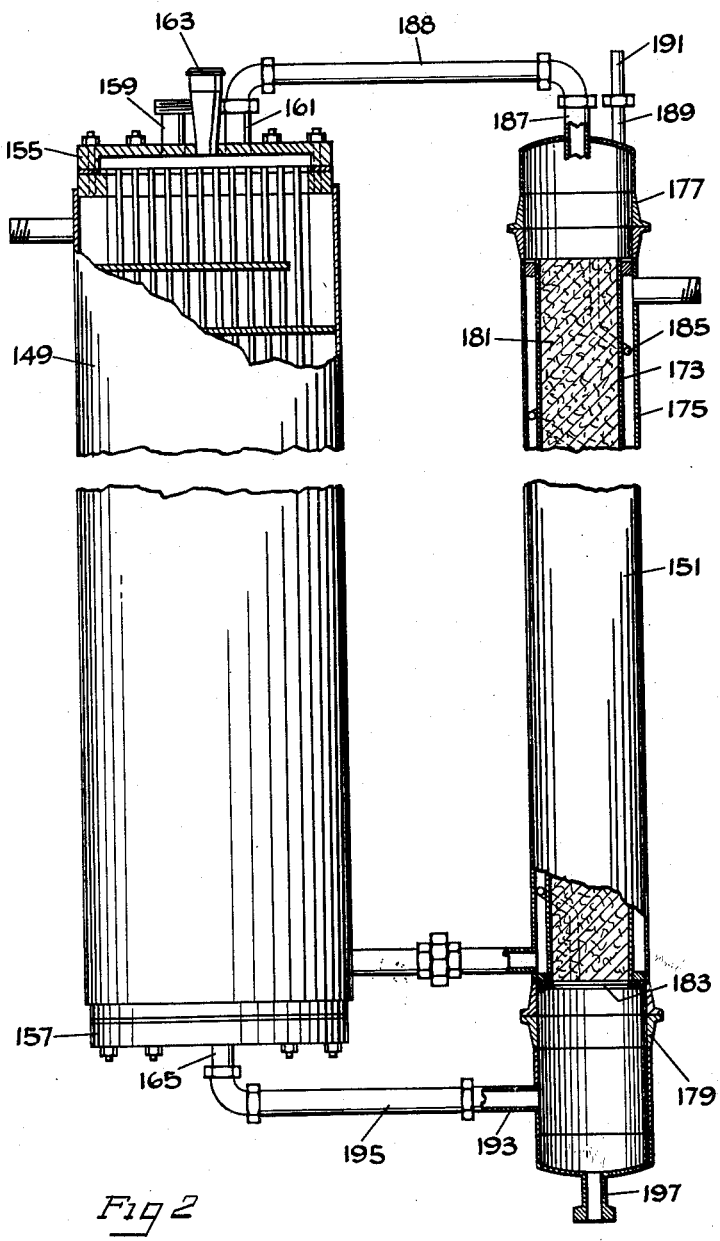

3,061,448
FRUIT JUICE CONCENTRATION
Julius J. Mojonnier, Winfield, and Miro A. Brna, Chicago, Ill., assignors to Mojonnier Bros. Co., Chicago, Ill., a corporation of Illinois
Filed Oct. 10, 1960, Ser. No. 61,485
5 Claims. (Cl. 99—205)

The present invention relates generally to the concentration of fruit juices, and more particularly, it relates to the concentration of grape juice and other juices having volatile aroma and flavor components which are separable from the juice.

Various fruit juices, including grape juice, have been preserved and packaged for subsequent distribution for some years. Until recently, the juice was usually bottled or canned at its naturally-occurring concentration, and was utilized by the consumer directly from the container.

Recent years, however, have seen an increased demand for fruit juice concentrate, from the standpoint of both the manufacturer and the consumer. The concentrate is usually refrigerated, and is reconstituted by the consumer by adding sufficient water thereto to approximate the strength of the natural juice. The reconstituted juice frequently is superior, in flavor and aroma, to juice which has been packaged in its dilute form. In addition, use of a juice concentrate results in lower shipping and packaging costs, which may allow marketing of the concentrate at a price comparable to that of the equivalent quantity of dilute juice.

Since the season for any particular fruit may be relatively short, it is desirable that the means for concentrating juice have a relatively high capacity to enable utilization of the available fruit during the season. At the same time, it is desirable that the apparatus have a low initial cost, and also that it have a low operating cost. It is further desirable that the concentration means produce a product which, upon reconstitution, closely resembles the fresh juice in flavor and aroma.

Accordingly, it is a general object of the present invention to provide improved means for concentrating fruit juices. A more particular object of the present invention is to provide an improved process and apparatus for concentrating grape juice. Another object of the present invention is to provide a process for concentrating fruit juice, which process can be practiced with relatively low capital and operating costs. A further object of the present invention is to provide a process for concentrating fruit juice whereby the natural aroma and flavor of the fresh juice is retained in the concentrated product.

Other objects and advantages of the present invention will become apparent from the following description and the accompanying drawings, in which:

FIGURE 1 is a schematic showing of apparatus, some of which is partially broken away, for a process embodying the invention; and FIGURE 2 is an elevational view, partly in cross section, of a portion of apparatus shown in the previous figure.

Referring now to FIGURE 1, it will be seen that apparatus suitable for the practice of the present invention generally comprises a first effect evaporator system 11, an essence recovery column 13, a second effect evaporator system 15, a vacuum system 16, and an essence cooling system 17. The process of the present invention contemplates, generally, partial vaporization of fresh fruit juice in the first effect evaporator system 11 to provide vapor and an intermediate liquid concentrate, enrichment of the vapor in aroma and flavor components in the essence recovery column 13 to provide essence, and partial vaporization of the intermediate liquid concentrate in the second effect evaporator system 15.

All portions of the equipment which come in contact with the process streams are desirably fabricated from or clad with stainless steel or other corrosion-resistant materials. This facilitates cleaning of the equipment, and provides a more sanitary operation and product.

The first effect evaporator system 11 includes a centrifugal pump 19, a preheater 21, a first effect vaporizer 23, and a first effect separation chamber 25. The discharge connection of the pump 19 is in communication with the inlet connection of the preheater 21 through a preheater feed line 27. A rotameter 29 is included within the length of the feed line 27.

The preheater 21 comprises a shell and tube heat exchanger in which the process stream is within the tubes. Steam is supplied to the shell of the preheater at the desired temperature through an appropriate pressure reducing station 31.

The outlet connection of the preheater 21 communicates with the first effect vaporizer 23 through a vaporizer feed line 33 and a pressure control valve 35. The pressure control valve 35 is a spring-loaded valve which may be set to maintain a predetermined pressure within the preheater 21.

The first effect vaporizer 23 comprises a two-pass shell and tube heat exchanger wherein the process stream is also within the tubes. Steam is supplied to the shell of the first effect vaporizer through an appropriate steam metering station 37. A frusto-conical horn 39 is disposed within the first effect vaporizer, and extends from the inlet connection of the vaporizer to the upper tube sheet 41 thereof. The horn 39 directs the incoming process stream to a tube bundle 43 in the first effect vaporizer.

The first effect separation chamber 25 comprises a chamber having a generally cylindrical upper section 45 and a conical lower section 47. The first effect separation chamber 25 is in communication with the first effect vaporizer 23 through a vaporizer discharge line 49, which is tangentially connected to the upper section 45 of the first effect separation chamber.

The first effect separation chamber further comprises an entrainment separator 51 disposed within the upper section 45 of the chamber. The entrainment separator 51 is desirably of a type which is readily cleanable without requiring dismantling of the chamber 25.

A float 53 is provided for detecting the level of liquid within the lower section 45 of the first effect chamber 25. An intermediate liquid concentrate outlet connection 55 is provided at the bottom of the lower conical section 47.

The first effect separation chamber 25 is in communication with the essence recovery column 13 through a column feed line 57, which extends from the upper section 45 of the first effect separation chamber 25 to a connection on the column 13 intermediate the top and bottom of the column.

The essence recovery column 13 comprises a vertical cylindrical shell 59 having a plurality of vapor-liquid contact stages. The contact stages in the column comprise a series of pooling baffle trays 61 disposed in alternating fashion within the shell 59, and provide relatively high vapor-liquid contact efficiency.

The essence recovery column 13 further comprises a reboiler section, denoted generally by the letter A, at the bottom of the column. A steam inlet connection 63 is provided in the shell 59 which is in communication with a steam injector ring 65 disposed within the column in the reboiler section A. A steam metering station 67 is provided to regulate the amount of steam which is introduced to the column through openings in the injector ring 65.

The column is provided with a bottoms outlet connection 69, which communicates with a pipe loop 71. The pipe loop 71 is positioned so as to maintain a predetermined level of liquid within the reboiler section A.

The column 13 further comprises an overhead vapor connection 73 and a reflux return connection 75, both of which are located near the top of the column.

The second effect evaporator section 15 includes a second effect vaporizer 77, a second effect separation chamber 79, and a condenser 81.

The second effect vaporizer 77 comprises a shell and tube heat exchanger, the shell of which is in communication with the column 13 through an overhead vapor line 83 connected to the overhead vapor connection 73 of the column. The second effect vaporizer 77 includes an upper tube sheet 85 and a lower tube sheet 87.

The second effect vaporizer 77 is provided with a feed connection 89 and a recycle connection 91, both of which connections are below the lower tube sheet 87. The feed connection 89 is in communication with the intermediate liquid concentrate outlet connection 55 of the separation chamber 25 through an intermediate liquid concentrate line 93. A level control valve 95 is located in the intermediate liquid concentrate line 93, and is actuated by the float 53 of the separation chamber 25.

An essence condensate connection 96 is provided in the lower portion of the shell of the second effect vaporizer 77 and is positioned above the lower tube sheet 87. The essence condensate connection 96 is in communication with the inlet of a reflux pump 97 through an essence condensate line 99. The discharge of the reflux pump 97 communicates with one leg of a T 101. A reflux return line 102 communicates with a second leg of the T 101, and extends to the reflux connection 75 of the essence recovery column 13. The third leg of the T 101 is in communication with the essence cooling system 17, as will be more fully set forth hereinafter.

A non-condensable gas outlet connection 104 is provided in the upper portion of the shell of the second effect vaporizer 77. The non-condensable gas outlet connection is in communication with the essence cooling system 17, as will be more fully set forth hereinafter.

The second effect separation chamber 79 is similar in construction to the first effect separation chamber 25, and includes a cylindrical upper section 103 and a conical lower section 105.

The second effect separation chamber 79 is in communication with the second effect vaporizer 77 through a duct 107. The duct 107 extends from a connection above the upper tube sheet 85 of the second effect vaporizer 77 to the upper section 103 of the second effect separation chamber 79.

The second effect separation chamber 79 includes a liquid outlet connection 109 which is in communication with the inlet of a recycle pump 111. The outlet of the recycle pump 111 forms one leg of a T 113. A second leg of the T 113 is in communication with the recycle inlet connection 89 of the second effect vaporizer 77. The third leg of the T 113 is in communication with the inlet of a metering gear pump 115, from which concentrated product is discharged through a product line 117.

An entrainment separator 119 is provided in the upper section 103 of the second effect separation chamber 79. The entrainment separator 119 is constructed similarly to the entrainment separator 51 in the first effect separation chamber 25.

The condenser 81 of the second effect evaporator system 15 comprises a cylindrical upper section 119 and a tapered lower section 121. The upper section 119 of the condenser 81 is in communication with the upper section 103 of the second effect separation chamber 79 through a vapor line 123. Cooling water is supplied to the upper section 119 of the condenser 81 through a metering unit 125.

The lower section 121 of the condenser 81 is in communication with the inlet of a condensate pump 127 through a condensate leg 129. The condensate pump discharge (not shown) may be connected to an appropriate disposal system.

The vacuum system 16 provides sub-atmospheric pressure conditions in the second effect evaporator system 15, and comprises a first stage steam ejector 131, a second stage steam ejector 133, and an interstage condenser 135. Steam is supplied to the first and second stage ejectors through steam lines 137 and 139, respectively. Cooling water is supplied to the interstage condenser 135 through a water line 141, and liquid is discharged from the interstage condenser to the condensate loop 129 through a seal loop 143.

The second effect evaporator system 15 is evacuated through a vacuum line 145, which communicates with the throat of the first stage steam ejector 131 of the vacuum system 16. The vacuum system is exhausted to the atmosphere through an exhaust line 147.

The essence cooling system 17 cools the essence and scrubs the non-condensable gases from the essence recovery column 13. The essence cooling system 17 comprises a cooler 149, a scrubber 151, and a water chiller 153.

As illustrated more clearly in FIGURE 2, the cooler 149 is a shell and tube heat exchanger having an upper head 155 and a lower head 157 and in which chilled water is circulated through the shell. The upper head 155 of the cooler is provided with an essence inlet connection 159, a chilled essence outlet connection 161, and a non-condensable gas inlet connection 163. The lower head 157 is provided with a non-condensable gas outlet connection 165. The upper and lower heads are appropriately baffled to separate the tubes to provide a multi-pass flow of essence and a multi-pass flow of non-condensable gases, and to provide an essence stream separated from the non-condensable gas stream.

The essence inlet connection 159 of the cooler 149 is in communication with the third leg of the T 101 (FIGURE 1) through an essence pump 167 and a rotameter 169. The non-condensable gas inlet connection 161 of the cooler 149 is in communication with the non-condensable gas outlet connection 104 of the second effect vaporizer 104 through a non-condensable gas line 171.

The scrubber 151 includes an inner shell 173 and an outer shell 175, and is provided with an upper head 177 and a lower head 179. The inner shell 173 is packed with saddles 181 or the like, which are supported upon a screen 183.

A helical baffle 185 is disposed in the annular space between the inner shell 173 and the outer shell 175. Chilled water is circulated through the annular space, and the helical baffle 185 serves to direct the flow of chilled water through a spiral path from the top to the bottom of the annular space.

The upper head 177 of the scrubber 151 is provided with a chilled essence inlet connection 187 and a non-condensable gas outlet connection 189. The chilled essence inlet connection 187 of the scrubber 151 is in communication with the chilled essence outlet connection 161 of the cooler 149 through a line 188. The non-condensable gas outlet connection 189 of the scrubber 151 is exhausted to the atmosphere through a line 191.

The lower head 179 of the scrubber 151 includes a non-condensable gas inlet connection 193, which is in communication with the non-condensable gas outlet connection 165 of the cooler 149 through a line 195. The lower head 179 of the scrubber 151 is provided with an essence product connection 197, through which essence product may be discharged for further processing through the seal loop 143 (FIGURE 1).

The water chiller 153 may be any means suitable for providing chilled water at about 34° F. Water is circulated through the essence cooling system 17 by a chilled water pump 201. Water chilled in the water chiller 153 is pumped by the chilled water pump 20 in the direction indicated by the arrows in FIGURE 1 through the annular space in the scrubber 151, thence through the shell of the cooler 149, and thence back to the water chiller 153.

While the process of the present invention is adaptable for the concentration of a variety of fruit juices whose aroma and flavor components are volatile and separable from the juice, the process has been advantageously used in the concentration of grape juice. Accordingly, the process will be particularly described with reference to grape juice, but it will be understood that the process is not necessarily limited thereto.

Preliminary operations in the preparation of grape juice which are not illustrated in the drawings include washing of the fresh whole grapes, removal of the stems from the grapes, depectinization of the grape juice and pulp, and separation of grape juice from the grape pulp to provide clarified fresh grape juice at a concentration of about 15.5° Brix. The clarified fresh juice provides the feed stock for the process of the present invention.

Referring now to FIGURE 1, the clarified fresh juice is pumped by the centrifugal pump 19 to the tubes of the preheater 21. The flow rate of the clarified juice, as indicated by the rotameter 29, is adjusted at a predetermined level and in the illustrated embodiment the flow rate is maintained at about 5800 pounds per hour. The juice is heated to a temperature in the range from about 220° F. to about 230° F. in the preheater 21 by suitably adjusting the steam pressure in the shell of the preheater.

The pressure control valve 35 is suitably adjusted to provide controlled vaporization of the clarified juice in the preheater 21. In this connection, the rate of flow of juice through the preheater 21 should be sufficient to insure turbulent flow within the tubes, in order that localized overheating of the grape juice does not occur. Accordingly, the pressure control valve 35 is adjusted to maintain a pressure at which sufficient vaporization of the grape juice occurs to provide turbulent flow.

The preheated juice is conducted from the preheater 21 to the first effect vaporizer 23 through the vaporizer feed line 33 and the pressure control valve 35. Upon leaving the pressure control valve 35, the preheated juice enters the region within the horn 39. Because of the lower pressure conditions therein, a portion of the preheated juice is flash vaporized at this point.

The preheated stream, which now comprises a mixture of vapor and liquid, is directed into the tubes in the central portion of the tube bundle 43 by the horn 39. The stream passes downwardly through the centrally-located tubes, and thence upwardly through tubes located outside the horn 39, thereby providing two-pass flow through the first effect vaporizer 23.

Sufficient steam is provided to the shell of the first effect vaporizer 23 through the steam metering station 37 to provide vaporization of about 30 percent of the clarified juice which is fed by the centrifugal pump 19. In this connection, the mixed vapor and liquid stream which flows through the vaporizer 23 provides a scouring action on the interior of the tubes of the vaporizer. This scouring action effectively minimizes fouling of the tubes by any degradation products.

The mixed vapor and liquid stream is conducted from the first effect vaporizer 23 to the first effect separation chamber 25 through the vaporizer discharge line 49. The separation chamber 25 effects separation of liquid from vapor, with the vapor phase being directed to the essence recovery column 13, and the liquid phase, which comprises an intermediate liquid concentrate, being directed to the second effect evaporator system 15.

In the first effect separation chamber 25, centrifugal force causes the liquid phase to be deposited upon the walls of the cylindrical upper section 45 of the separation chamber, and to be collected within the conical lower section 47. The float 53 within the lower section 47 senses the level of liquid therein, and actuates the level control valve 95 in the intermediate liquid concentrate line 93 to maintain a predetermined level of liquid within the first effect separation chamber 25. In the illustrated embodiment, the flow rate of intermediate liquid concentrate from the first effect separation chamber is about 3780 pounds per hour of liquid having a concentration of about 18° Brix.

The vapor phase passes through the entrainment separator 51 of the first effect separation chamber 25, wherein substantially all of the entrained liquid is removed from the vapor stream. The vapor is then conducted to the essence recovery column 13 through the column feed line 57. In the illustrated embodiment, the vapor flow rate through the column feed line is about 2,000 pounds per hour.

The vapor entering the essence recovery column 13, comprising about 30 percent of the clarified grape juice feed, includes a majority of the flavor and aroma components of the fresh juice. In this connection, the flavor and aroma components are more volatile than water, and approximately 90 percent of these components are volatilized in the first effect evaporator system 11. Thus, the vapor entering the essence recovery column includes about 90 percent of the flavor and aroma components.

In the essence recovery column 13, the vapor is enriched in flavor and aroma components to provide about a 100-fold to 150-fold essence, that is, a material in which the flavor and aroma components are from about 100 times to about 150 times more concentrated than in fresh grape juice. This essence may then be added back to the concentrated liquid product to restore the aroma and flavor of fresh grape juice.

Accordingly, the vapor introduced to the essence recovery column 13 passes upwardly therethrough, and contacts a downwardly flowing stream of refluxed liquid. The vapor is enriched in the more volatile flavor and aroma constituents, and passes overhead from the column through the overhead vapor connection 73. Liquid reflux is introduced to the column 59 through the reflux connection 75, and flows downwardly therethrough. The liquid is progressively depleted of the volatile flavor and aroma components, and is collected in the reboiler section A of the column 13.

In order that the liquid within the reboiler section A of the column be stripped of substantially all of the flavor and aroma components, additional heat is supplied thereto. It has been discovered that the stripping is substantially more complete when the heat is supplied by live steam than when it is supplied through a heat exchange surface. Accordingly, live steam is injected into the reboiler section A through the injector ring 65, and, in the illustrated embodiment, about 70 pounds of live steam per hour is introduced.

The reason or reasons for the improved performance of the column 13 when live steam is introduced to the reboiler section A are not altogether understood. An analogy to steam distillation techniques can only be suggested as a possible explanation.

The stripped liquid from the reboiler section A of the column 13 is continuously removed through the bottoms outlet connection 69 and through the pipe loop 71. The liquid is comprised essentially of water, and may be conducted to sewer.

The overhead vapor from the column 13 is conducted through the overhead vapor line 83 to the shell of the second effect vaporizer 77. In the second-effect vaporizer 77, the heat of vaporization of the overhead vapor from the column 13 is transferred to the intermediate liquid concentrate from the first effect separation chamber 25. In this connection, intermediate liquid concentrate is introduced to the tubes of the second effect vaporizer 77 through the feed inlet connection 89. The second effect evaporator system 15, including the tubes of the second-effect vaporizer 77, is maintained at a vacuum of about 27 inches of mercury by the vacuum system 16. Under this reduced pressure, the boiling point of the intermediate liquid concentrate is substantially lowered, enabling the heat of vaporization of the overhead vapor to be transferred thereto.

Thus, the overhead vapor from the column 13, at a temperature slightly less than 212° F., is condensed upon the shell side of the tubes in the second effect vaporizer 77 to provide an essence condensate. The essence condensate flows outwardly from the shell of the vaporizer through the essence condensate connection 96 to the inlet of the reflux pump 97. The essence condensate is thence pumped to the T 101, where the flow is divided into a reflux stream, which is returned, to the column 13 through the reflux line 102, and an essence stream, which is then conducted to the essence cooling system 17.

The intermediate liquid concentrate from the first-effect separation chamber 25 is partially vaporized within the tubes of the second effect vaporizer 77 at a temperature of about 115° F. The mixture of liquid and vapor formed thereby is conducted to the second effect separation chamber 79 through the duct 107.

In the second-effect separation chamber 79, the liquid and vapor phases are centrifugally separated, and the vapor phase flows through the entrainment separator 119 and into the condenser 81. Water, including that water condensed from the vapor, is then removed from the condenser by the condensate pump 127.

The liquid phase from the second effect separation chamber is continuously withdrawn by the recycle pump 111. The discharge stream from the recycle pump 111 is split into two streams at the T 113. One of the streams is recycled to the tubes of the second effect vaporizer 77 through the recycle connection 91. The other stream is conducted to the inlet of the metering gear pump 115, from which it is discharged through the product line 117 as a concentrated grape junce. In the illustrated embodiment, about 2,000 pounds per hour of concentrated grape juice, having a concentration of about 46° Brix, is produced.

Non-condensable gases are released in the first-effect evaporator system 11, and collect in the upper portion of the shell of the second effect vaporizer 77. These non-condensable gases include small amounts of uncondensed flavor and aroma components, which are desirably recovered. The essence cooling system 17 is provided for this purpose, and for the purpose of cooling the essence.

As described hereinbefore, the flow of essence condensate from the reflux pump 97 is split into two streams at the T 101. The essence stream from the T 101 is conducted to the essence pump 167. The essence pump is regulated to provide an essence flow rate, as indicated by the rotameter 169, of from about 1/100 to about 1/150 the flow rate of the fresh grape juice feed, as indicated by the rotameter 29. Thus, essence is produced which may be from about 100 fold essence to about 150 fold essence.

The essence is then conducted to the cooler 149 through the essence inlet connection 159 (FIGURE 2). In the cooler 149, the essence is brought to a temperature from about 34° F. to about 36° F. The chilled essence then flows outwardly from the cooler 149 through the chilled essence outlet connection 161 and into the upper head 177 of the scrubber 151.

Non-condensable gases are conducted outwardly from the shell of the second effect vaporizer 77 through the non-condsensable gas outlet connection 104. The non-condensable gases are then introduced to the cooler 149 through the non-condensable gas inlet connection 163, wherein the gases are cooled. The gases then pass outwardly from the cooler and into the lower head 179 of the scrubber 151 through the non-condensable gas inlet connection 193.

In the scrubber 151, chilled essence flows downwardly through the inner shell 173, and non-condensable gases flow upwardly therethrough. The saddles 181 within the inner shell 173 provide a large surface area for contacting the essence with the non-condensable gases. Thus, a substantial portion of the flavor and aroma components contained in the non-condensable gases are transferred therefrom to the essence. The scrubbed non-condensable gases are discharged to the atmosphere through the line 191.

The essence product is discharged from the scrubber 151 through the seal loop 199. The essence product may thereafter be added back to the grape juice concentrate from the product line 117, in a step not illustrated, to restore the flavor and aroma of fresh juice to the concentrate.

It should be noted that, in the process of the invention, steam and cooling water requirements are minimized. In this connection, the essence recovery column 13 is operated with only a nominal steam requirement in the reboiler section A, and no cooling water is required for condensing the overhead vapor. The latter condensation, as explained hereinbefore, is effected by the intermediate liquid product. Thus, operating costs are reduced.

An important feature of the present invention is the relative ease of operation. In this connection, after equilibrium conditions are obtained, the only operating variables demanding attention are the grape juice feed rate indicated by the rotameter 29, the essence flow rate indicated by the rotameter 169, and the solids content of the juice concentrate. The respective flow rates are readily adjusted, and the solids content is controllable by the amount of steam introduced to the first effect vaporizer 23. Thus, the entire process may be operated by one man.

Another important feature of the present invention is the high recovery of flavor and aroma components in the essence. As pointed out hereinbefore, the essence recovery column 13 operates to enrich the overhead vapor with substantially all of the flavor and aroma components, and the essence cooling system prevents substantial losses thereof in the non-condensable gases.

Another feature of the present invention is the adaptability of the process for compact installation of apparatus, thereby enabling apparatus of relative high capacity to be housed in a minimum of space. In this connection, the dual function of the second-effect vaporizer 77, i.e., condensation of overhead vapor and vaporization of intermediate liquid concentrate, contributes to compact installation. In addition, the dual function of the second-effect vaporizer contributes to economical capital costs.

Thus, there has been provided a process for concentrating fruit juice. The process has economical capital and operating costs, and produces a product which is comparable in flavor and aroma to fresh juice.

Various modifications of the invention will be apparent from the foregoing description and drawings, but as such are deemed to be within the scope of the present invention.

Various of the features of the present invention are set forth in the following claims:

What is claimed is:

1. A process for concentration of fruit juice comprising the steps of vaporizing a portion of the juice to provide vapor and an intermediate liquid concentrate, conducting the vapor to a distillation zone wherein the vapor is enriched in flavor and aroma components to provide essence, conducting the essence from the distillation zone and condensing the essence by transferring its heat of vaporization to the intermediate liquid concentrate while the intermediate liquid concentrate is subjected to vacuum conditions and while the intermediate liquid concentrate and the essence are maintained separate from one another, thereby producing concentrated liquid product and essence condensate, and returning a portion of the essence condensate to the distillation zone to enrich the vapor in flavor and aroma components.

2. A process for concentration of fruit juice comprising the steps of vaporizing a portion of the juice to provide vapor and an intermediate liquid concentrate, conducting the vapor to a distillation zone wherein the vapor is enriched in flavor and aroma components to provide essence, conducting the essence from the distillation zone and condensing the essence by transferring its heat of vaporization to the intermediate liquid concentrate while the intermediate liquid concentrate is subject to vacuum conditions and while the intermediate liquid concentrate and the essence are maintained separate from one another, thereby producing concentrated liquid product and essence condensate, returning a first portion of the essence condensate to the distillation zone to enrich the vapor in flavor and aroma components, and blending a second portion of the essence condensate with the concentrated liquid product.

3. A process for concentration of grape juice comprising the steps of vaporizing a portion of the juice to provide vapor and an intermediate liquid concentrate, conducting the vapor to a distillation zone wherein the vapor is enriched in flavor and aroma components to provide essence, conducting the essence from the distillation zone and condensing the essence by transferring its heat of vaporization to the intermediate liquid concentrate while the intermediate liquid concentrate is subjected to vacuum conditions and while the intermediate liquid concentrate and the essence are maintained separate from one another, thereby producing concentrated liquid product and essence condensate, and returning a portion of the essence condensate to the distillation zone to enrich the vapor in flavor and aroma components.

4. A process for concentration of grape juice comprising the steps of vaporizing a portion of the juice to provide vapor and an intermediate liquid concentrate, conducting the vapor to a distillation zone wherein the vapor is enriched in flavor and aroma components to provide essence, conducting the essence from the distillation zone and condensing the essence by transferring its heat of vaporization to the intermediate liquid concentrate while the intermediate liquid concentrate is subjected to vacuum conditions and while the intermediate liquid concentrate and the essence are maintained separate from one another, thereby producing concentrated liquid product and essence condensate, returning a first portion of the essence condensate to the distillation zone to enrich the vapor in flavor and aroma components, and blending a second portion of the essence condensate with the concentrated liquid product.

5. A process for concentration of grape juice comprising the steps of vaporizing a portion of the juice to provide vapor and an intermediate liquid concentrate, conducting the vapor to a distillation zone wherein the vapor is enriched in flavor and aroma components to provide essence, conducting the essence from the distillation zone and condensing the essence by transferring its heat of vaporization through an impervious wall to the intermediate liquid concentrate while the intermediate liquid concentrate is subjected to vacuum conditions and while the intermediate liquid concentrate and the essence are maintained separate from one another, thereby producing concentrated liquid product and essence condensate, returning a first portion of the essence condensate to the distillation zone to enrich the vapor in flavor and aroma components, and blending a second portion of the essence condensate with the concentrated liquid product.

References Cited in the file of this patent

UNITED STATES PATENTS

| | | |
|---|---|---|
| 2,450,774 | Zahm | Oct. 5, 1948 |
| 2,773,774 | McCarthy | Dec. 11, 1956 |